United States Patent [19]
McGillvary

[11] 3,879,161
[45] Apr. 22, 1975

[54] APPARATUS FOR CENTRIFUGAL CASTING

[75] Inventor: Daniel Ross McGillvary, Jackson Township, Stark County, Ohio

[73] Assignee: The Firestone Tire & Rubber Company, Akron, Ohio

[22] Filed: Jan. 26, 1973

[21] Appl. No.: 327,041

Related U.S. Application Data

[62] Division of Ser. No. 159,893, July 6, 1971, Pat. No. 3,751,551.

[52] U.S. Cl. ............... 425/435; 264/311; 264/315; 425/33
[51] Int. Cl. ............................................. B29c 5/04
[58] Field of Search .......... 425/425, 435, 429, 430, 425/457, 387, 33; 264/311, 315

[56] References Cited
UNITED STATES PATENTS

| | | | |
|---|---|---|---|
| 2,858,566 | 11/1958 | Brundage | 425/33 |
| 3,049,162 | 8/1962 | Rosenbaum et al. | 264/311 X |
| 3,290,426 | 12/1966 | Barrentine | 264/311 X |
| 3,645,655 | 2/1972 | Beneze | 264/311 X |

*Primary Examiner*—Robert L. Spicer, Jr.

[57] ABSTRACT

The process of centrifugally casting an article such as a tire or the like from a curable or hardenable liquid polymeric material, which process includes the steps of selecting a mold and placing a core within the mold which core is hollow and/or is readily deformable under pressure but which has sufficient memory to resume its original position when the pressure is removed. The article being formed is formed between the core and the mold. The space between the core and the mold is filled with the curable liquid material of which the article is to be formed and the hollow core is also filled with a liquid material. The liquid material in the hollow core, the material from which the core is constructed and the curable liquid material all have about the same specific gravity. The mold and core are rotated to centrifugally cast the article which is formed of the curable liquid material. The deformable core permits easy removal from the completed article and the matching of the specific gravities as aforementioned keeps the deformable core from distorting during the centrifugal casting operation. The order of introducing the liquid material into the core, introducing the curable liquid into the space between the mold and core and rotation of the mold and core can be varied within the limits as set forth in the following description. Variations in the structure for accomplishing the principle of matching specific gravities are illustrated and described.

11 Claims, 8 Drawing Figures

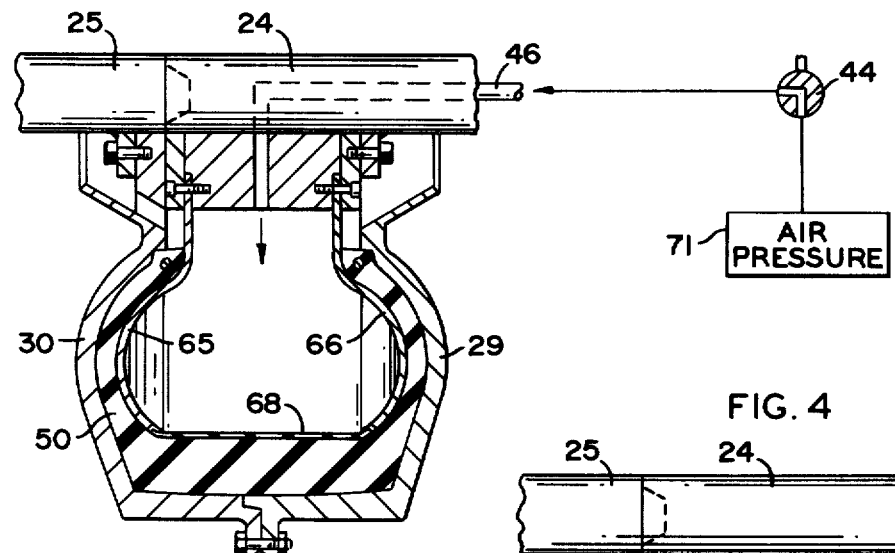
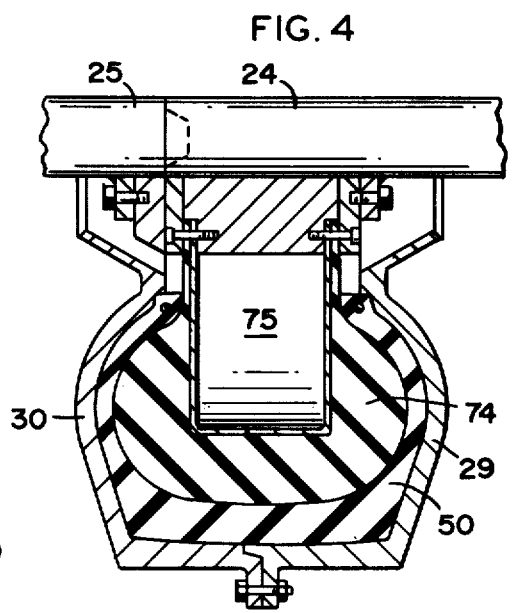
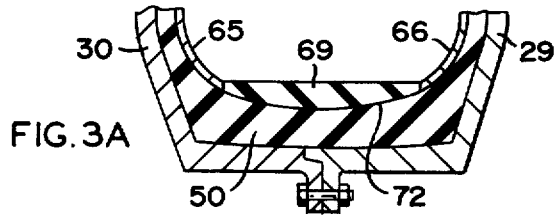
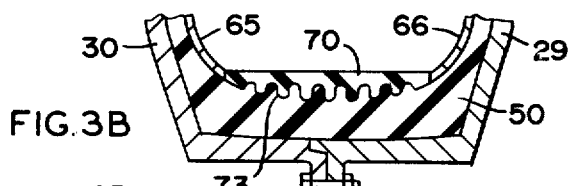
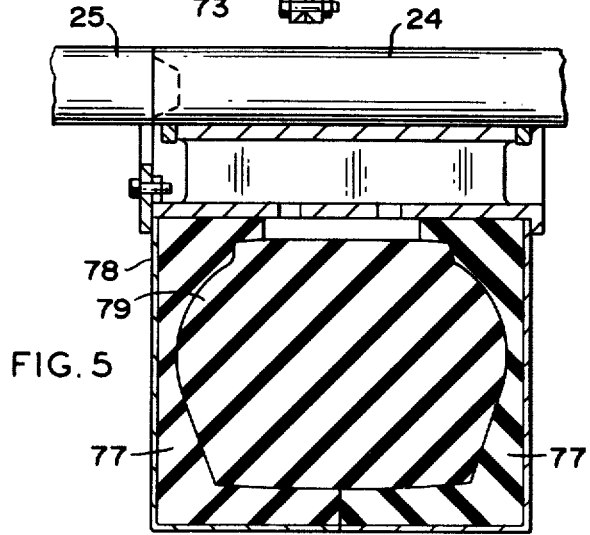
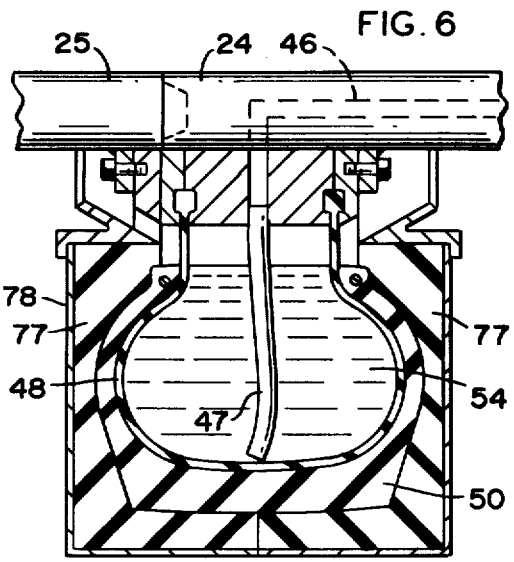

3,879,161

APPARATUS FOR CENTRIFUGAL CASTING

This is a division of U.S. Pat. application Ser. No. 159,893 filed July 6, 1971, now U.S. Pat. No. 3,751,551.

Centrifugal casting has been employed for some time and is a useful technique commonly used by many diverse industries. It is frequently utilized by the rubber and plastics industry to avoid air entrapment in the fabrication of various shapes and centrifugal casting is a technique now used to some degree in the casting of vehicle tires.

The technique commonly employed involves the use of a metal mold spinning symmetrically on an axis of rotation. In the case of vehicle tires and other items which are generally hollow, a core must be employed which is usually made of metal or other rigid material. The core is usually made up of many pieces which are heavy, difficult to insert and remove, and cause uneven cure of the molded item as well as having numerous other disadvantages. There are many occasions when it is desirable to use a flexible, elastic, and possibly inflatable core to replace the rigid core, however, the problem with these type of structures is to keep the flexible core in position and have it retain its original shape under the centrifugal force developed by the rotation of the mold.

The primary object of the present invention is to provide, in the centrifugal casting of tires and similar items, a process which will enable the use of a flexible and resiliently yieldable core which can be easily removed from the finally cured and finished tire and which will not be distorted by the centrifugal force which is encountered in the centrifugal casting process. For the sake of brevity the underlying principle will hereinafter be sometimes referred to as the "matching of specific gravities," however, the entire understanding of the principles will best be understood by reference to the drawings which show the best mode contemplated for carrying out the teachings of the invention.

Before proceeding to the drawings and a more precise description of carrying out the present invention, a brief discussion of some of the principles involved in the present invention are in order. If one, for the sake of discussion, takes the example of a mold which is filled with a liquid and spun or rotated, it can be said that the liquid will have a higher pressure within itself the further one proceeds from the center of rotation. The liquid will also exert that same pressure gradient on all parts with which it is in contact and in the specific case of casting a tire this will be both the core and the mold. The pressure, and therefore the distorting force, on a flexible core, at any given point is a function of the depth of the liquid, rotational speed, specific gravity, and the position of rotation. The present invention contemplates the designing of a flexible core of rubber or some similar material that is sufficiently rigid to maintain its molded shape when it is standing alone and at rest (free standing) but which normally would be distorted under the centrifugal force encountered in centrifugal casting. Next let it be assumed that the specific gravity of the material of the core is designed to match the specific gravity of the curable liquid which is to be cast and also for the purpose of this discussion let it be assumed that a liquid is available which will be used to fill the hollow core (balancing liquid) which is of the same specific gravity as the core material and the castable curable material.

The mold is filled with the curable liquid polymeric material in the precise amount needed to produce the finished article, in the space between the mold and the core. The hollow core is then filled with the balancing liquid, so that the same level of curable liquid material is maintained as in the balancing liquid. Now as the mold and core are spun or rotated, there will be no effective distorting force on the core since all forces are now automatically in balance because the same forces are being exerted on one side of the core as on the other. The core, since it is constructed of a material which has sufficient "memory" to return to its original shape, will be free to assume its original molded shape. It will thus be seen that if we have the same force on the outside of the core as on the inside, then there will be no effective distorting force in the centrifugal casting process.

Other objects and a fuller understanding of this invention may be had by referring to the following description and claims, taken in conjunction with the accompanying drawings, in which:

FIG. 3 is a fragmentary view in section showing a modification of the apparatus illustrated in FIGS. 1 and 2 with the modification being primarily in the construction of the core;

FIGS. 3A and 3B illustrate how the lower surface of the diaphragm may be varied;

FIG. 4 is a fragmentary view in section showing a still further modification of the apparatus illustrated in FIGS. 1 and 2 and showing a variation in the core construction;

FIG. 5 is a fragmentary view in section illustrating how the teachings of the present invention can be applied to the construction of a mold as distinguished from a core as illustrated in FIGS. 1 through 4; and FIG. 6 is a fragmentary view in section showing a combination utilizing the present teachings in the mold as well as the core or in other words, a combination of FIGS. 1 and 5.

Figure 1:
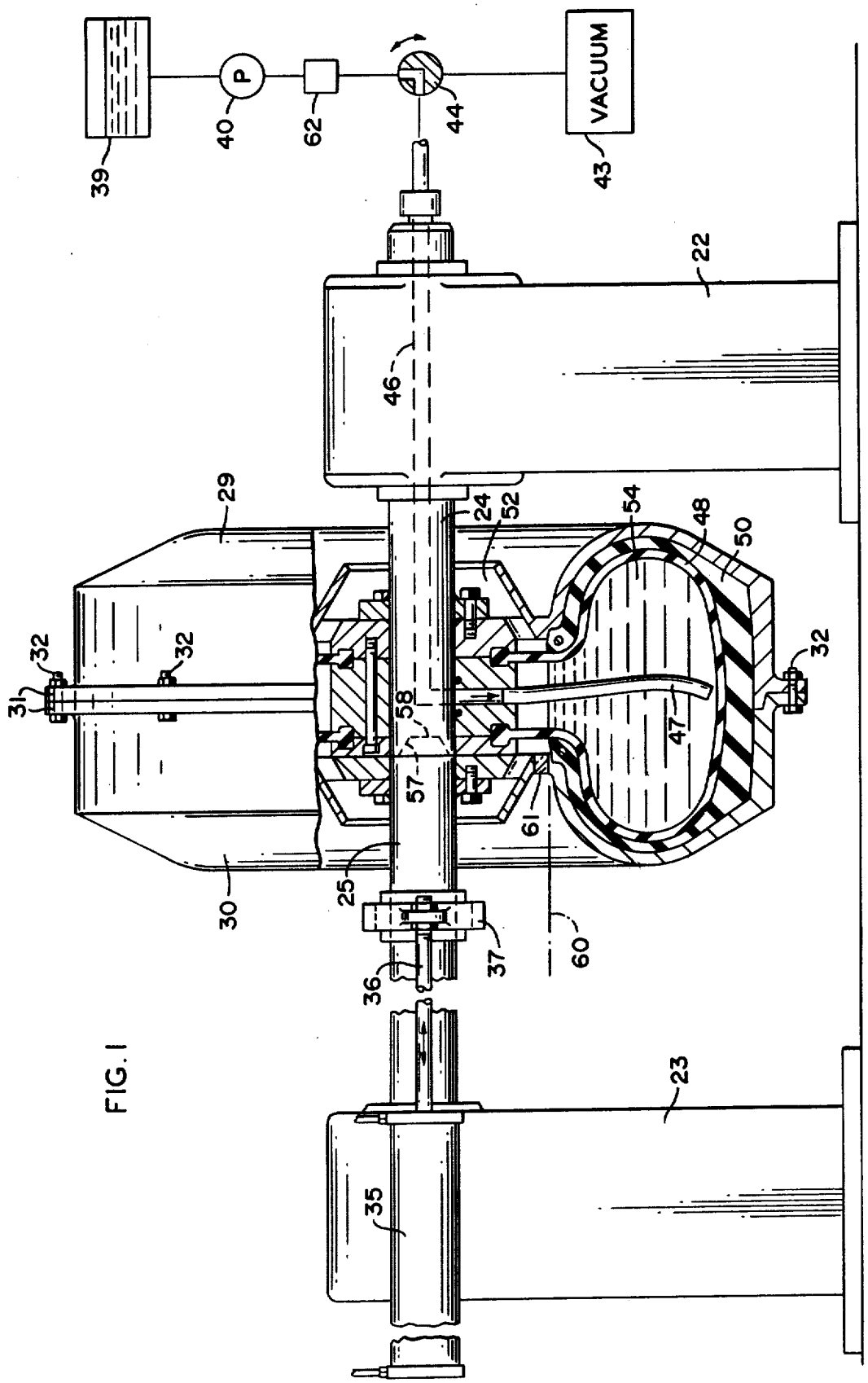
FIG. 1 is an elevational view partially in section of the centrifugal casting apparatus incorporating the teachings of the present invention and utilized for carrying out the process of the present invention.

Referring specifically to FIG. 1 of the drawings, there is shown the apparatus of the present invention which is capable of conveniently and economically carrying out the process of the present invention. Shown in FIG. 1 are first and second mounting pedestals 22 and 23 which respectively support rotatable shafts 24 and 25. Either one or both of the pedestals may incorporate means for rotatably driving the shafts 24 and 25, however, this means has not been specifically shown because it forms no particular part of the present invention. A first centrifugal mold half 29 is secured to the shaft 24 in the manner shown and in a similar manner a second centrifugal mold half 30 is rotatably secured to shaft 25. Each of the mold halves 29 and 30 are provided with flanges both of which are identified by the reference numeral 31 and the flanges are adapted to be held together by bolts 32. This means of connecting the mold halves together has been shown for convenience, however, it will be appreciated by those skilled in the art that many different means may be utilized to hold the halves together which may be more quickly disconnected than the bolts which have been shown.

An air cylinder 35 is mounted on pedestal 23 and includes a piston rod 36 which is connected to a collar 37 which in turn is secured for longitudinal movement to shaft 25. This means of connection permits uninhibited rotational movement of the shaft 25 with respect to the rod 36 and air cylinder 35, however, the air cylinder when actuated enables the mold half 30 to be moved relative to the mold half 29 as shown by the different positions of the same in FIGS. 1 and 2.

Mounted within the confines of the mold halves 29 and 30 is a flexible core member 48, in this particular instance constructed of a rubber material, and the construction of the core 48 is such that when no forces or pressures are applied thereto it has sufficient resiliency or memory to assume the position as shown in FIG. 1. The completed tire shape is designed so as to have its outer shape defined by the inner walls of the mold halves 29 and 30 and its inner shape defined by the outer surface or outer wall of the flexible core 48. The hardenable liquid polymeric material has been indicated by the reference numeral 50 in FIG. 1 and as shown in FIG. 1 this polymeric material has hardened to its finely cured state, but those skilled in the art will appreciate that before hardening this material is in liquid form. An opening 52 is provided in the hub of mold half 29 and is for the purpose of permitting the introduction of the hardenable liquid polymeric material prior to curing to its solid state.

The apparatus illustrated in FIG. 1 also includes conduit means 46 which is provided in shaft 24 and pedestal 22 which conduit means leads to a vacuum source 43 or a pump 40 depending upon the position of a valve 44. The pump 40 is provided in the conduit means which leads to a stabilizing liquid material source 39 and is for the purpose of pumping a precise amount of stabilizing liquid material 54 when desired, to the hollow flexible core and which will be discussed more fully hereinafter. It will be noted particularly in FIG. 2 as well as being shown in FIG. 1, that the shaft 24 is provided with a depressed or female portion 57 which is adapted to receive a male portion 58 which is provided on the end of shaft 25. The reason for this is that after the vehicle tire has been completed in the apparatus of the present invention and in accordance with the teachings of the process, the mold halves must be separated and the shafts must separate so that the completed tire can be removed. FIG. 1 as illustrated shows the flexible core 48 filled with the precise amount of stabilizing liquid material 54 desired in accordance with the teachings of the present invention.

The hardenable liquid polymeric material 50 which is introduced through opening 52 to produce the completed vehicle tire will, for the sake of example in the present teachings, be a polyurethane material, which may have a specific gravity in the range of from 1.03 to 1.30. The construction of the flexible core 48 from the rubber material will then also be designed and produced so that its specific gravity is, from a practical technical standpoint, the same as the specific gravity of the material 50. In turn the stabilizing liquid material 54 which can be essentially any liquid, is designed so that its specific gravity is the same as the specific gravity of the material of the core 48 and of the hardenable liquid polymeric material 50. The stabilizing liquid material 54 might be a water and salt mixture, an oil or even a polyurethane material but with the polymerizing end groups inactivated so that it remains in a liquid form. With respect to the core 48 it may be constructed with or without supporting cords, may be of a perfectly plain gum stock or for example a 60/40 synthetic to natural rubber blend. The core should in effect be "free standing" and should hold its shape for example within 0.02 inch.

Figure 2:
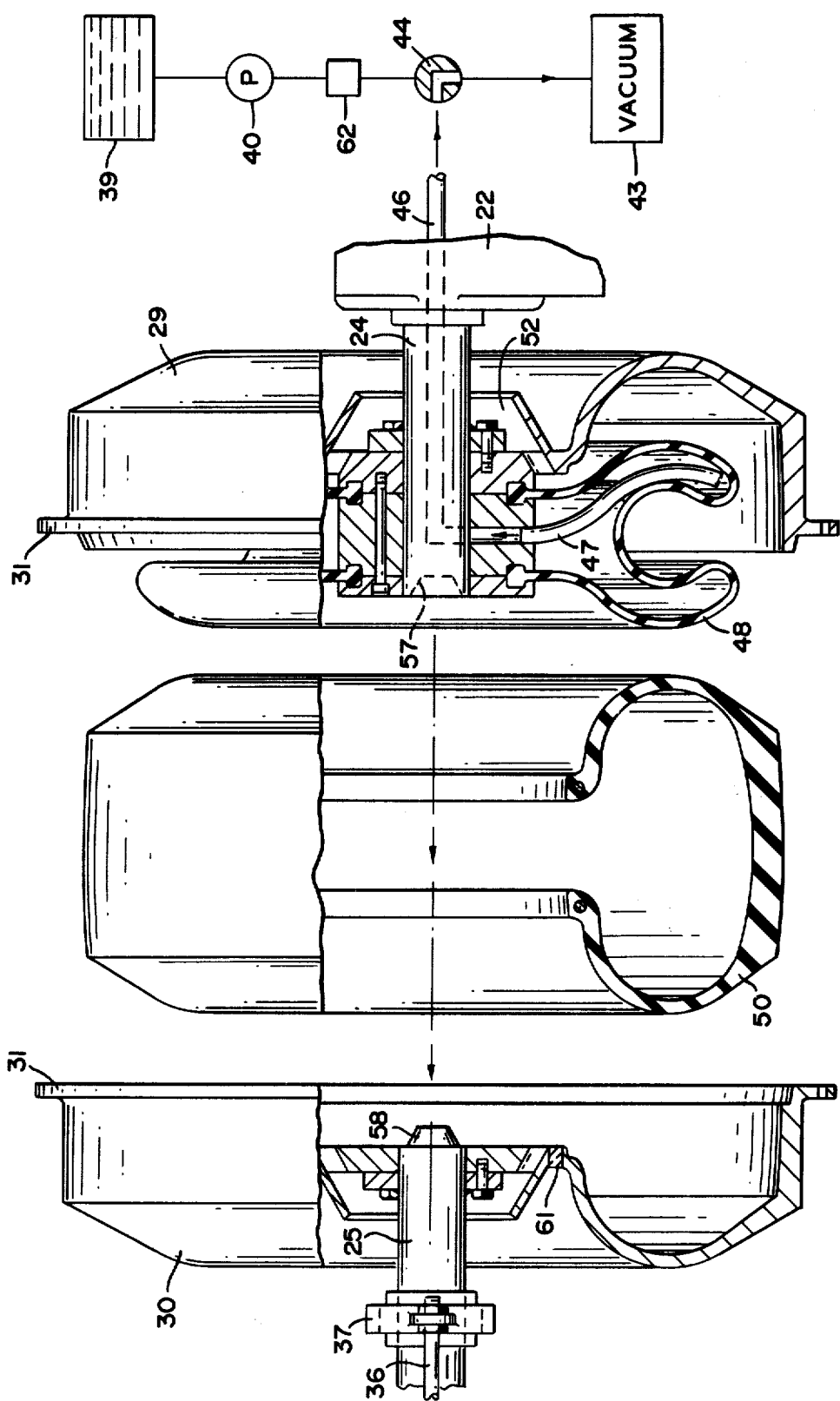
FIG. 2 is a view similar to FIG. 1 but showing the parts of the apparatus shown in FIG. 1 moved to a different position so as to be able to discharge a completed vehicle tire.

The production of a vehicle tire in the apparatus of FIG. 1 and in accordance with the teachings of the process of the present invention will best be understood from a brief description of the steps involved. With the apparatus essentially in the position shown in FIG. 1 with the exception that no hardenable liquid polymeric material 50 is yet present and the flexible core 48 is in the inactive or withdrawn condition as shown in FIG. 2, the centrifugal mold comprising the mold halves 29 and 30 is rotatively driven and the precise amount of hardenable liquid polymeric material 50 is introduced into the mold through opening 52. The valve 44 is shifted to the position of FIG. 1 and a precise amount of stabilizing liquid material 54 is pumped into the hollow flexible core 48 through conduit means 46 so that the level of stabilizing liquid material 54 in the rotating condition of the mold is at the same height or the same level as the amount or the level of the hardenable liquid polymeric material. This level has been indicated by the dot-dash line 60 in FIG. 1 and if desired, the apparatus may have a transparent peep hole 61 through which the level can be observed by observing the core 48. It will be appreciated that the vacuum is released and the stabilizing liquid material causes the flexible core to distend itself or move to the position shown in FIG. 1. It will thus be seen that the centrifugal forces in the stabilizing liquid material 54, in the hardenable liquid polymeric material 50 and in the flexible core 48, are essentially the same at any given distance and there is in effect no net force tending to distort the flexible core. The core has sufficient memory or resiliency to assume its molded or formed condition and it will reassume this condition in which it is shown in FIG. 1 and as a result the centrifugal molding process can continue until the vehicle tire has been sufficiently cured so that the molding process can be stopped and the tire removed from the mold. It will also be appreciated by those skilled in the art that the stabilizing liquid material 54 which is utilized within the core can also be utilized in curing the tire as it is being centrifugally cast. To this end a heating means 62 has been illustrated in the conduit which leads to the liquid source 39 so that any desired heat can be imparted to the stabilizing liquid material. After the tire has been formed, the action of the pump 40 is reversed causing the stabilising liquid material 54 to be withdrawn from the flexible core and pumped back into the source 39. A flexible plastic or rubber tube 47 is connected to conduit means 46 and is for the purpose of assuring withdrawal of all the liquid material 54. The valve 44 is then manipulated to the position shown in FIG. 2, which causes the flexible core to be withdrawn or retracted somewhat to the position of FIG. 2 and then air cylinder 35 is retracted, after bolts 32 have been removed, which causes mold half 30 to be moved to the position shown in FIG. 2 at which time the completed tire can be conveniently removed by slightly further distorting the flexible core 48 with no damage to the same. After this has been accomplished the parts are returned to the position of FIG. 1 and the process is ready to be repeated.

FIG. 3 is a modification of the teachings of the present invention and a modification occurring principally in the construction of the previously identified flexible core 48. This modification enables one to eliminate the necessity of the stabilizing liquid 54. The mold halves have been identified by the same reference numerals as used in FIGS. 1 and 2 as well as the other structure where it is the same. The core which is utilized in FIG. 3 includes first and second shaped sides 65 and 66 constructed of a metal material which has sufficient rigidity to counteract any of the forces encountered in the centrifugal casting process of the present invention and utilizing the hardenable liquid polymeric material which has been discussed hereinabove. A rubber diaphragm 68 is attached to the opposite lower ends of the sides 65 and 66 as shown in FIG. 3. Conduit 46 connects the interior of the core of FIG. 3 to an air pressure source 71 through valve 44. It will thus be seen that the centrifugal casting process is carried out in essentially the same manner as discussed above in conjunction with FIGS. 1 and 2, however, in this particular circumstance, the distorting forces produced by the centrifugal force in the hardenable liquid polymeric material 50 are balanced above the rubber diaphragm 68 by the introduction of air pressure from the air pressure source 71. To this air pressure will be added the force resulting from the rotating diaphragm 68. It will be appreciated that a rather delicate control must be maintained on the air pressure supply introduced into the hollow core because the distorting force within the liquid 50 is a function of the rotational speed of the mold and as a result when the rotational speed of the mold changes, the distorting force within the liquid will change. The sides 65 and 66 may be made in arcuate segments if desired, to facilitate removal of the finished tire.

FIGS. 3A and 3B illustrate how the shape of the diaphragm 68 shown in FIG. 3 can be varied. These diaphragms have been identified by the reference numerals 69 and 70 and like 68 are of the same specific gravity as the liquid material 50. Their upper surface (the surface exposed to the air pressure) must be flat as in the case of diaphragm 68, however, their lower surfaces may be shaped as desired to give the desired contour to the inside of the tire. The lower surfaces of diaphragms 69 and 70 are identified by reference numerals 72 and 73 respectively.

FIG. 4 shows a still further modification of the invention as illustrated in FIGS. 1 through 3 and in this embodiment there is illustrated a "solid rubber" core. In this particular regard the solid rubber core has been illustrated by the reference numeral 74 and it is shown mounted on a hub 75 which hub extends in a generally circumferentially extending direction and which can be readily disassembled so that the core can be more conveniently collapsed to air in the removal of the finally finished vehicle tire. In this regard, the hub 75 can be made in circumferentially extending sections. The only requirement in this particular construction is that the specific gravity of the material of the solid rubber core 74 be the same as the specific gravity of the hardenable liquid polymeric material 50 which is introduced thereinto during the centrifugal casting process. Whether one considers the embodiments of FIGS. 1, 3 or 4, it can always be said that one is balancing the specific gravity of the core so as to conform to the specific gravity of the curable liquid material.

FIG. 5 illustrates the teachings of the present invention as applied to the mold rather than to the core. Many prior art disclosures have alluded to or envisioned the use of cheap rubber molds within a light metal covering so as to provide support, however, the rubber form or mold which has previously been envisioned must either be stiff enough to prevent growth, or be reinforced or supported in some way. If they are stiff enough or have a high degree of reinforcement they are in and of themselves difficult and expensive to manufacture. FIG. 5 illustrates how the present teachings of "matching specific gravities" can be applied to a mold. The rubber of the mold need only be strong enough to maintain its shape while spinning and not tear while disassembling the part which has been formed therein. In this regard FIG. 5 shows a mold 77 formed in the shape as shown, of a relatively inexpensive rubber material which is supported in a rather inexact manner by a thin metal housing 78. The material of construction of the mold 77 is designed so as to be of the same specific gravity of the hardenable liquid of the same specific gravity of the hardenable liquid polymeric material which is to be cast thereinto during the centrifugal casting process. It will therefore be seen that the corners or any surface portions on the internal surface of the mold 77 will not have a tendency to distort because of the centrifugal force applied thereto and exerted by the polymeric material because the specific gravities are the same and at the same positions from the radius of rotation and will be exerting the same counteracting forces. The tire 79 produced is a solid rubber tire as shown.

The modification shown in FIG. 6 is a combination of the teachings of FIGS. 1 and 5. Stated another way, the mold of FIG. 5 has been incorporated into the apparatus of FIG. 1. To this extent the mold halves 77 are contained in housing 78 and flexible core 48 is located therein, and is adapted to be filled with liquid material 54. The apparatus function in the same manner as described in conjunction with FIGS. 1 and 2. It will be appreciated that the mold of FIG. 6 may also be used in combination with the cores of FIGS. 3 and 4.

The resinous materials which are capable of being utilized in accordance with the teachings of the present invention are practically unlimited, the principal consideration being that the resin, whatever its nature, be a liquid prior to curing. The resin must be curable and may be cured by heat, by addition of a cross-linking agent, or by catalyst, by condensation, by chemical reaction, or any combination thereof. Tires constructed in accordance with the teachings of this invention are preferably constructed with what are commonly referred to as polyurethane resins. For the most part these are of the polyether type; however, polyester-type urethanes may also be used for this purpose. The composition of these materials are well known and reference may be had for example to U.S. Pat. Nos. 2,852,483 and 2,814,605 and 2,814,606 for specific examples of polyether-polyurethanes and polyester-polyurethanes. These materials are readily available commercially as prepolymers having a viscosity comparable to that of honey. The polyurethanes generally have specific gravities in the range of from 1.03 to 1.30. The resins of the present invention would normally be considered to be an organic compound of high molecular weight above say about 1,000, containing repeating units achieved by a process encompassing any mechanism resulting in an increase in molecular weight, and including for example, polymerization, condensation, addition graft polymerization, block polymerization, cross-linking, solvation etc., or any combination thereof. The resin or resins hereof are polymeric or resinous materials in which the extent of polymerization is insufficient to convert the material from a normally liquid state to a jelled or fully cured solid state. Such curable liquid resins include therefore, prepolymers, plastisols, A and B stage resins, latently catalyzed resins, etc. The resins are in their final cured state, that is their solid state, when any of the foregoing processes of increase in molecular weight occur and such increase is terminated either by exhaustion of reactant materials, utilization of the entire amount of cross-linking agent, removal of heat, use of chain stopping reactants, or the like. As indicated above, the final cured products are preferably elastomeric, that is, in their final cured state they possess resilience or elasticity.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be restored to without departing from the spirit and the scope of the invention as hereinafter claimed.

What is claimed is:

1. Apparatus for centrifugally casting an article including in combination a mold, means for rotating said mold, a hollow flexible core mounted within said mold which core is deformable under pressure but has sufficient memory to resume its original position when the pressure is removed, a curable liquid material in the space between the core and mold which material is to form the finished article, a stabilizing liquid material in said hollow core, said material of construction of said core, said curable liquid material and said stabilizing liquid material all having substantially the same specific gravity.

2. Apparatus as claimed in claim 1, wherein the article is a vehicle tire and the mold is constructed of a relatively rigid material.

3. Apparatus as claimed in claim 2, wherein the relatively rigid material is metal.

4. Apparatus as claimed in claim 1, wherein the article is a vehicle tire and the mold is mounted for rotation by a substantially horizontally disposed shaft, means are provided for introducing and removing the stabilizing liquid material from the hollow core.

5. Apparatus as claimed in claim 4, wherein means are provided for heating the stabilizing liquid material prior to being introduced into the hollow core.

6. Apparatus for centrifugally casting an article including in combination a mold, means for rotating said mold, a solid and flexible core mounted within said mold which core is deformable under pressure but has sufficient memory to resume its original position when the pressure is removed, a curable liquid material in the space between the core and mold which material is to form the finished article, said material of construction of said core and said curable liquid material having substantially the same specific gravity.

7. Apparatus as claimed in claim 6, wherein the article is a vehicle tire and the mold is constructed of a relatively rigid material.

8. Apparatus as claimed in claim 6, wherein the relatively rigid material is metal.

9. Apparatus as claimed in claim 6, wherein the article is a vehicle tire and the mold is mounted for rotation by a substantially horizontally disposed shaft.

10. Apparatus for centrifugally casting an article including in combination a mold, means for rotating said mold, said mold being solid and is deformable under pressure but has sufficient memory to resume its original position when the pressure is removed, a curable liquid material in the mold which material is to form the finished article, said material of construction of said mold and said curable liquid material having substantially the same specific gravity.

11. Apparatus for centrifugally casting an article including in combination a mold, means for rotating said mold, a flexible diaphragm mounted a spaced distance from the mold to define a space, means for introducing a curable liquid material of which the article is to be formed between the mold and the diaphragm in the space, and means for introducing a gas under pressure to the side of the diaphragm opposite the side adapted to receive the curable liquid material.

* * * * *